(12) United States Patent
Iwamichi et al.

(10) Patent No.: US 10,550,901 B2
(45) Date of Patent: Feb. 4, 2020

(54) ELECTRIC PARKING BRAKE DEVICE

(71) Applicant: ADVICS CO., LTD., Kariya-shi, Aichi-ken (JP)

(72) Inventors: Tomoki Iwamichi, Kariya (JP); Hiroshi Anda, Kariya (JP)

(73) Assignee: ADVICS CO., LTD., Kariya-Shi, Aichi-Ken (JP)

( * ) Notice: Subject to any disclaimer, the term of this patent is extended or adjusted under 35 U.S.C. 154(b) by 0 days.

(21) Appl. No.: 15/758,547

(22) PCT Filed: Sep. 16, 2016

(86) PCT No.: PCT/JP2016/077482
§ 371 (c)(1),
(2) Date: Mar. 8, 2018

(87) PCT Pub. No.: WO2017/047765
PCT Pub. Date: Mar. 23, 2017

(65) Prior Publication Data
US 2018/0274610 A1    Sep. 27, 2018

(30) Foreign Application Priority Data

Sep. 16, 2015  (JP) ................................ 2015-182486

(51) Int. Cl.
*F16D 65/097*  (2006.01)
*F16D 65/18*  (2006.01)
(Continued)

(52) U.S. Cl.
CPC ........ *F16D 65/0971* (2013.01); *B60T 13/741* (2013.01); *B60T 13/746* (2013.01);
(Continued)

(58) Field of Classification Search
CPC ...... F16D 65/092; F16D 65/18; F16D 65/095; F16D 65/0971; F16D 65/40; F16D 65/38;
(Continued)

(56) References Cited

U.S. PATENT DOCUMENTS 6,105,736 A * 8/2000 Akita .................. F16D 65/0006
188/251 A
2006/0027427 A1* 2/2006 Anda .................. F16D 65/0006
188/73.1
(Continued)

FOREIGN PATENT DOCUMENTS

JP           3-118328 U      6/1991
JP         2000-145839 A    5/2000
(Continued)

OTHER PUBLICATIONS

*International Search Report (PCT/ISA/210) dated Nov. 8, 2016, by the Japanese Patent Office as the International Searching Authority for International Application No. PCT/JP2016/077482.

*Primary Examiner* — Robert A. Siconolfi
*Assistant Examiner* — San M Aung
(74) *Attorney, Agent, or Firm* — Buchanan Ingersoll & Rooney PC

(57) ABSTRACT

An electric parking brake device includes an inner engaging part formed on an inner shim, wherein the engaging part engages with a projection projecting from the back face of an inner brake pad so that mutual rotation about the central axis of a piston is controlled. An outer hook is formed on an outer shim, wherein the outer hook slidably locks to the outer circumferential edge of an outer brake pad. The outer hook is configured so that at least one of same is provided on each of an outer circumferential end on the outside of and an outer circumferential end on the inside of the outer brake pad in the radial direction and so that the set spring constant
(Continued)

allows the outer shim to move to the outside in the radial direction with respect to the outer brake pad while the parking brake is applied.

2 Claims, 7 Drawing Sheets

(51) Int. Cl.
  *F16D 55/227* (2006.01)
  *F16D 121/24* (2012.01)
  *F16D 125/40* (2012.01)
  *B60T 13/74* (2006.01)
(52) U.S. Cl.
  CPC .......... *F16D 55/227* (2013.01); *F16D 65/18* (2013.01); *F16D 2121/24* (2013.01); *F16D 2125/40* (2013.01)
(58) Field of Classification Search
  CPC .... F16D 65/183; F16D 55/226; F16D 55/227; F16D 2121/04; F16D 2125/40; B60T 13/741; B60T 13/746
  USPC .................................. 188/72.1, 71.1, 250 B
  See application file for complete search history.

(56) References Cited

U.S. PATENT DOCUMENTS

| | | | | |
|---|---|---|---|---|
| 2006/0157307 A1* | 7/2006 | Tsurumi | .............. | F16D 65/0979 188/250 G |
| 2007/0209888 A1* | 9/2007 | Adachi | ................... | F16D 65/18 188/72.7 |
| 2008/0087503 A1* | 4/2008 | Wake | .................... | F16D 65/092 188/71.1 |
| 2009/0000880 A1* | 1/2009 | Noguchi | ............. | F16D 65/0971 188/71.7 |
| 2013/0001025 A1* | 1/2013 | Tanabe | .................... | F16D 65/02 188/72.4 |
| 2013/0068574 A1* | 3/2013 | Arbesman | ........... | F16D 65/0971 188/73.37 |
| 2014/0360822 A1* | 12/2014 | Kobayashi | ............ | F16D 65/095 188/250 E |

FOREIGN PATENT DOCUMENTS

| | | |
|---|---|---|
| JP | 2008-95832 A | 4/2008 |
| JP | 2013-71643 A | 4/2013 |

\* cited by examiner

[Fig.1]
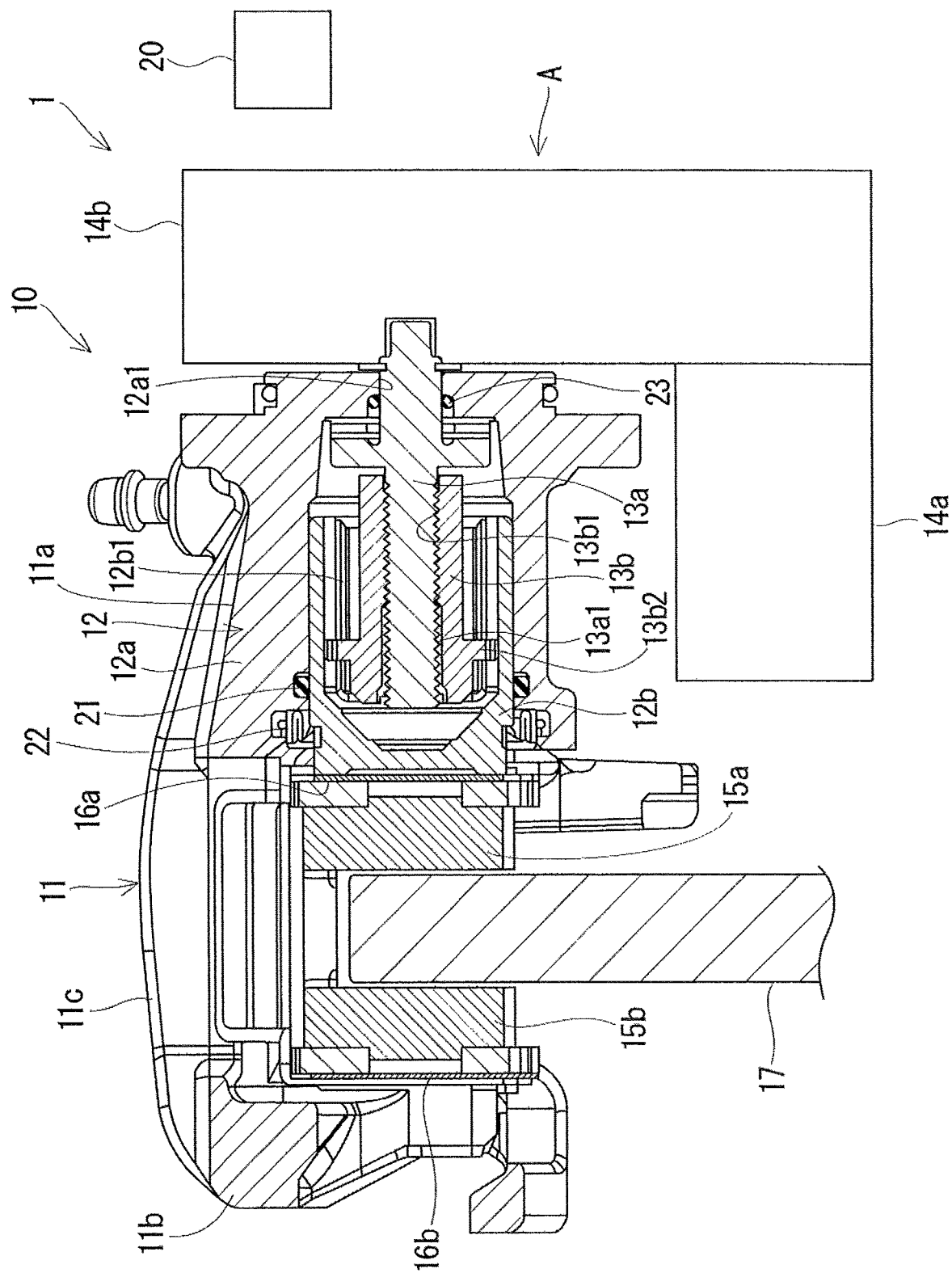

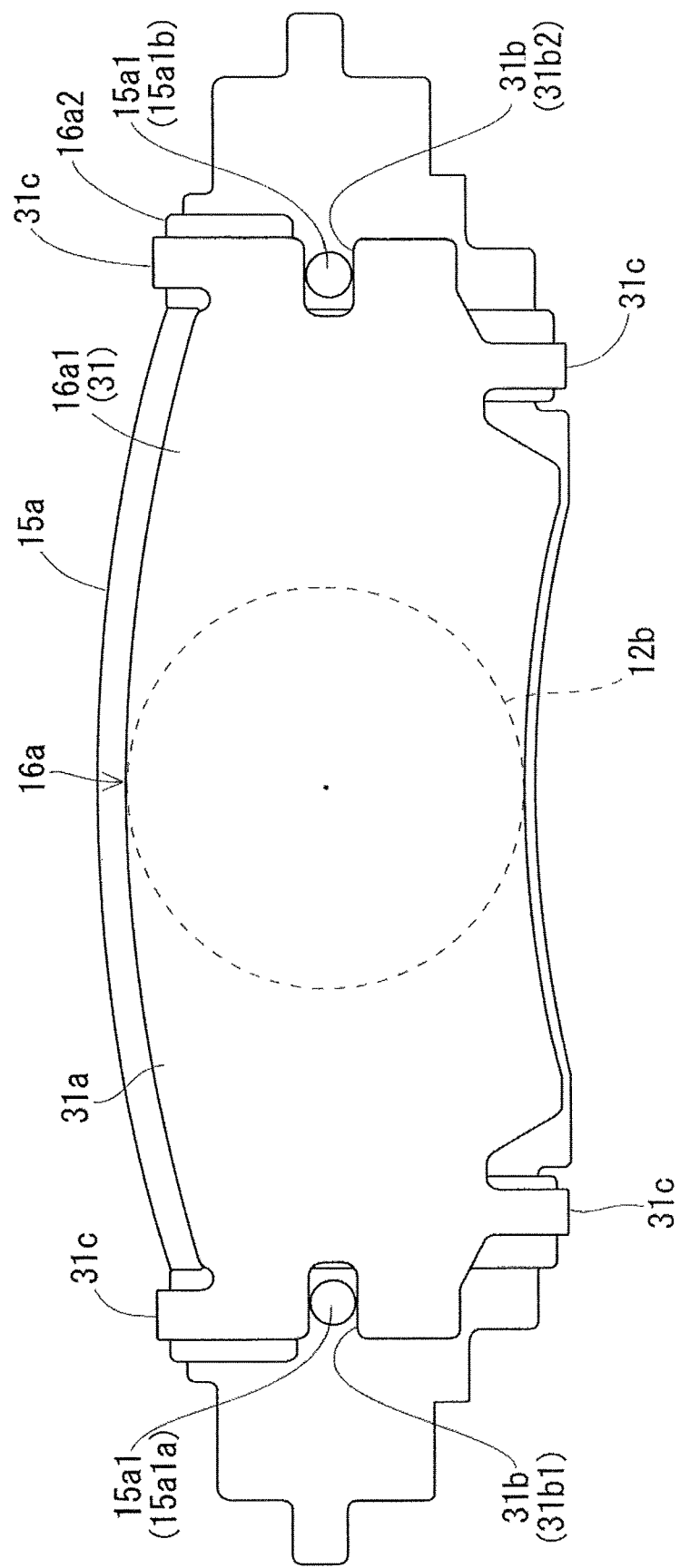
[Fig.2]

[Fig.3a]
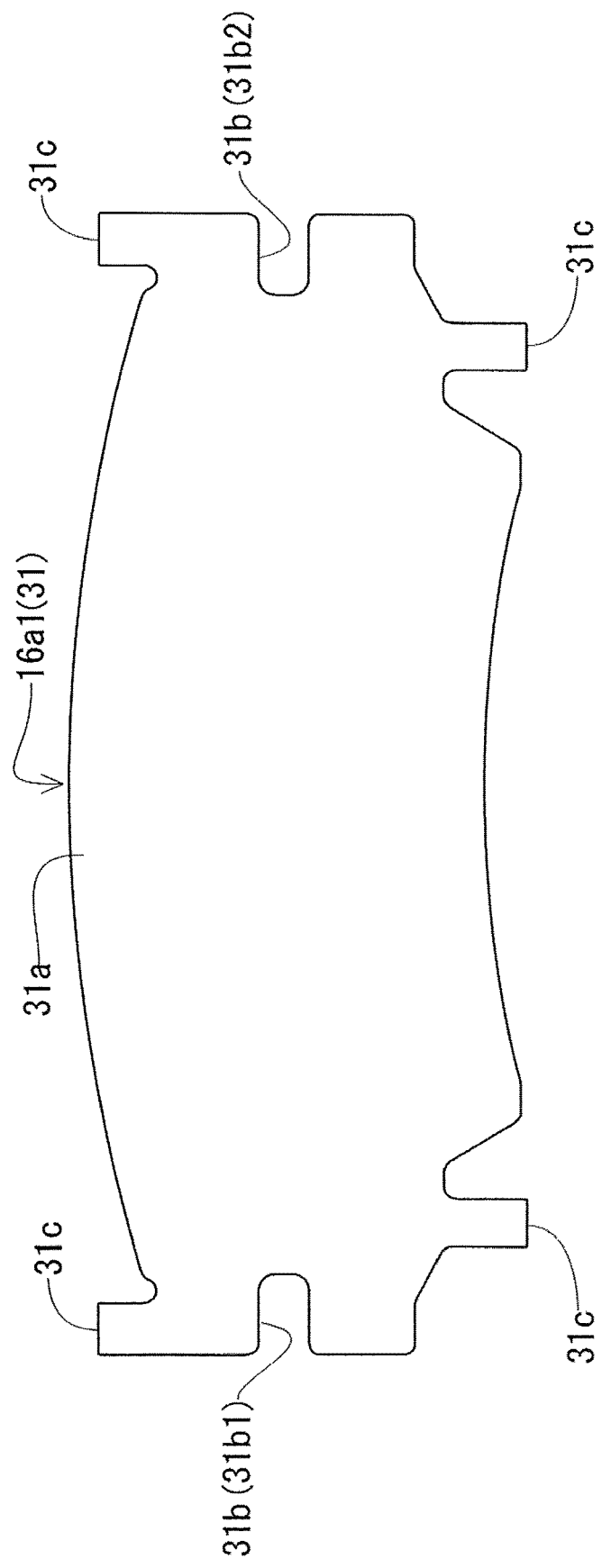

[Fig.3b]
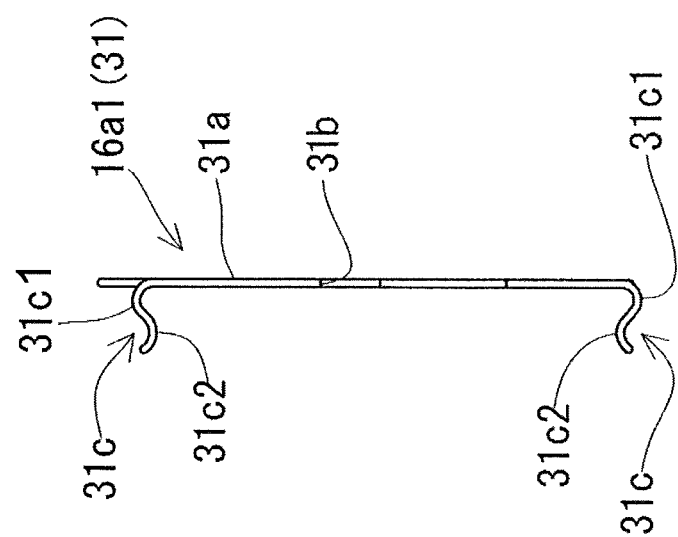

[Fig.4]
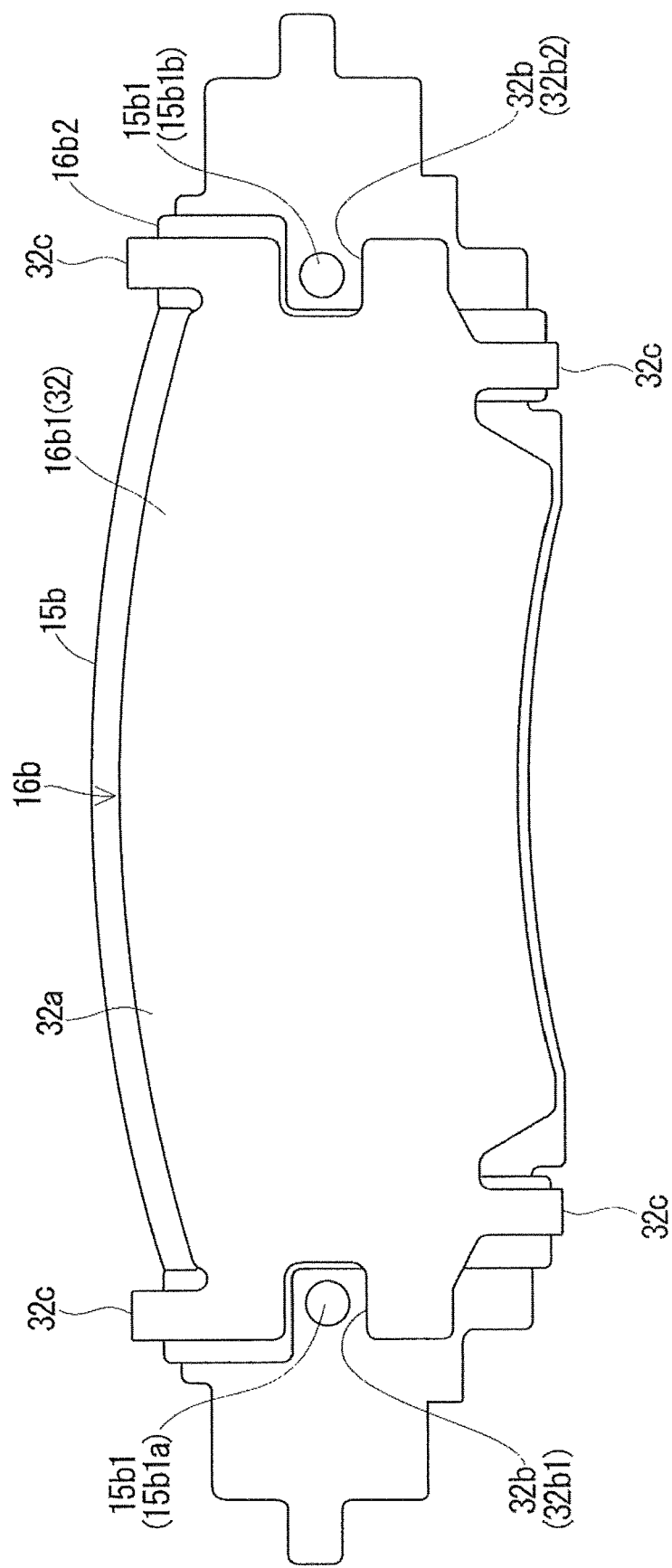

[Fig.5a]
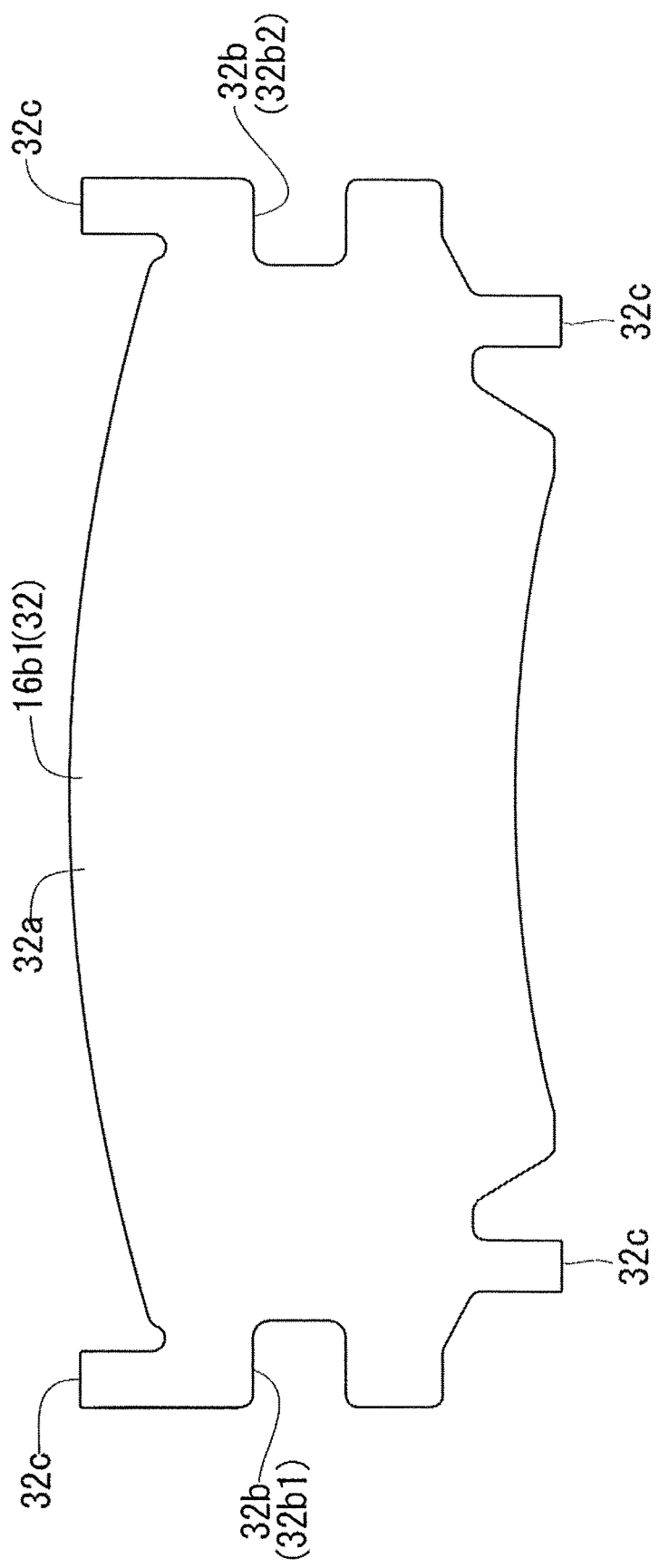

[Fig.5b]
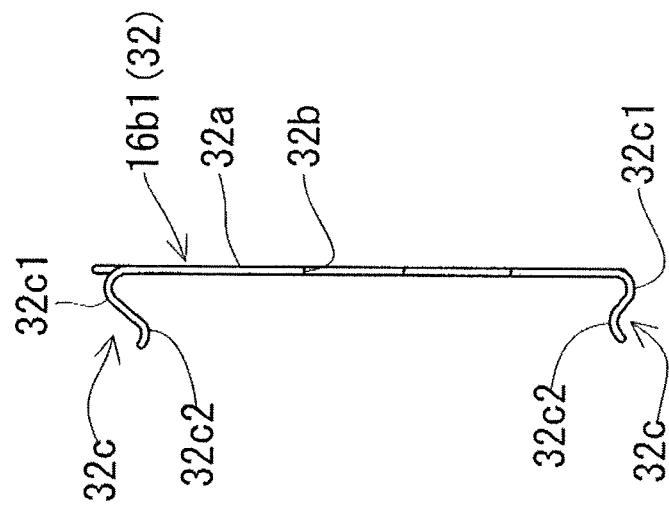

ELECTRIC PARKING BRAKE DEVICE

TECHNICAL FIELD

The present invention relates to an electric parking brake device.

BACKGROUND ART

As a form of an electric parking brake device, a structure disclosed in Patent Literature 1 has been known. An electric parking brake shown in FIG. 1 of Patent Literature 1 is structured as follows. A propulsion member 35 moves in a direction where brake pads 24, 25 come into contact with a disc rotor 4 by driving electric motors 32 in a positive rotation. The propulsion member 35 moves a piston 29, so that the piston 29 presses each of the brake pads 24, 25 against the disc rotor 4 as lock operation.

As a form of a disc brake device for a vehicle, a structure disclosed in Patent Literature 2 has been known. In a disc brake device for a vehicle shown in FIG. 1 of Patent Literature 2, a pad 12 (inner pad) and a shim 28 are engaged with each other through an engaging long hole 32 and a projection 34. Therefore, each of the pad 12 and the shim 28 is restrained from relatively rotating about a central axis of the piston.

CITATIONS LIST

Patent Literatures

Patent Literature 1: JP 2013-071643 A
Patent Literature 2: JP H03-118328 U

SUMMARY OF INVENTION

Technical Problems

In an electric parking brake device which is structured by applying the disc brake device for a vehicle disclosed in Patent Literature 2 to the electric parking brake device disclosed in Patent Literature 1, when brake operation is performed, relative rotation between the shim 28 which is disposed on an inner side and a piston 26 about the central axis of the piston is restrained. However, in inner and outer both side portions of a caliper, which respectively hold an inner brake pad and an outer brake pad, force which operates in a direction away from the inner side portion is generated on the outer side portion while a parking brake is performed. That is, force which operates in a radially outer direction side is applied to the outer brake pad from the outer side portion of the caliper due to an application of the parking brake. Therefore, the force which operates in a radial direction is not buffered, so that the electric parking brake device is sometimes damaged.

The present invention has been devised in order to solve the problem described above. It is an object of the present invention to provide an electric parking brake device which suppresses damage while a parking brake is performed.

Solutions to Problems

To achieve the above object, according to the present invention, an electric parking brake device is configured to drive a parking brake actuator. The parking brake actuator is configured to convert a rotational movement of a rotation member into a linear movement to transmit the linear movement to a piston. The parking brake actuator is also configured to press a brake disc rotated with a wheel by an inner brake pad that is disposed in an inner side portion of inner and outer both side portions of a caliper and that is forced by the piston and an outer brake pad disposed in an outer side portion of the caliper so as to be located at an opposite side to the inner brake pad, to generate braking force on the wheel. The inner brake pad includes an inner shim disposed on a back face of the inner brake pad that is provided on an opposite side to the brake disc. The outer brake pad includes an outer shim disposed on a back face of the outer brake pad that is provided on an opposite side to the brake disc. The inner shim is provided with an inner engaging part that is engaged with a projection projecting from a portion of the back face of the inner brake pad so that relative rotation about a central axis of the piston is restricted. The outer shim is provided with outer hooks that are slidably engaged with an outer periphery edge of the outer brake pad. At least one of the outer hooks is provided on an outer periphery end in a radially outer direction side of the outer brake and at least one of the outer hooks is provided on an outer periphery end in a radially inner direction side of the outer brake pad. Each outer has a set spring constant that is set to allow the outer shim to move in the radially outer direction side with respect to the outer brake pad while a parking brake that generates the braking force is performed.

Advantageous Effects of Invention

According to the above structure, the inner shim is provided with the inner engaging part that is engaged with the projection projecting from a portion of the back face of the inner brake pad so that relative rotation about the central axis of the piston is restricted. Therefore, although torque (braking torque) is generated on the piston while the parking brake is performed, the relative rotation of the inner shim to the inner brake pad is restricted. Consequently, the piston is also restricted from relatively rotating to the inner brake pad. Hence, damage of a piston seal or a piston boot which is sometimes damaged by rotation of the piston is suppressed.

Further, the set spring constant of each outer hook of the outer shim is set to allow the outer shim to move in the radially outer direction side with respect to the outer brake pad while the parking brake that generates the braking force is performed. Therefore, although force which operates in the radially outer direction side is applied to the outer brake pad from the outer side portion of the caliper due to an application of the parking brake, the force in the radial direction is buffered by the outer shim to suppress damage of the electric parking brake device.

As described above, the electric parking brake device whose damage is suppressed while the parking brake is performed is provided.

BRIEF DESCRIPTION OF DRAWINGS

FIG. 1 is a sectional schematic view of a brake mechanism of a rear wheel system showing an embodiment of an electric parking brake device of the present invention.

FIG. 2 is a front view of an inner brake pad shown in FIG. 1.

FIG. 3a is a front view of an inner shim shown in FIG. 2.
FIG. 3b is a side view of the inner shim shown in FIG. 2.
FIG. 4 is a front view of an outer brake pad shown in FIG. 1.

FIG. 5a is a front view of an outer shim shown in FIG. 4.
FIG. 5b is a side view of the outer shim shown in FIG. 4.

DESCRIPTION OF EMBODIMENTS

With reference to the drawings, a description of an embodiment of an electric parking brake device of the present invention will be made hereinafter. In this embodiment, as a brake control device for a vehicle of an embodiment of the present invention, an explanation will be made by way of example with reference to a brake system for a vehicle which applies a disc brake-type electric parking brake (EPB) device (which will be referred to as "EPB" hereinafter) to a rear wheel system.

This brake system is provided with a service brake (not shown) which generates braking force based on a pedal effort of a driver and an EPB 1 for restricting a vehicle from moving while the vehicle is parked. The brake system includes a brake mechanism which is a mechanical structure generating the braking force on each of wheels. A brake mechanism (not shown) of a front wheel system has a structure generating the braking force by operating the service brake. A brake mechanism 10 of a rear wheel system has a structure for common use generating the braking force by operating the service brake and the EPB 1. The brake mechanism of the front wheel system is a conventional brake mechanism which has been generally used, and corresponds to the brake mechanism 10 of the rear wheel system, from which a mechanism generating the braking force based on operation of the EPB 1 is omitted. Therefore, the description thereof will not be given here. In the following, the brake mechanism 10 of the rear wheel system will be described.

According to the brake mechanism 10 of the rear wheel system, even when not only the service brake, but also the EPB 1 is operated, a pair of brake pads 15a, 15b each of which is a friction material shown in FIG. 1 are pressed to sandwich a brake disc 17 which is a material to be rubbed, so that friction force is generated between the brake pads 15a, 15b and the brake disc 17, and the braking force is thus generated.

The EPB 1 is configured to contain the brake mechanism 10 and an EPB control device (which will be referred to as "EPB-ECU" hereinafter) 20.

The brake mechanism 10 includes a caliper 11, a wheel cylinder portion 12, a driving shaft member 13a, a propulsion shaft member 13b, an electric motor 14a, a gear box 14b, the pair of brake pads 15a, 15b, a pair of shims 16a, 16b, and the brake disc 17.

The caliper 11 is formed into a U shape in section, and includes inner and outer side portions 11a, 11b and a connection portion 11c which connects outer periphery portions of the inner and outer side portions 11a, 11b. An outer circumference portion of the brake disc 17 is inserted between the inner side portion 11a and the outer side portion 11b.

The inner side portion 11a is attached to and fixed to a vehicle body side. The wheel cylinder portion 12 is provided in the inner side portion 11a. The wheel cylinder portion 12 includes a cylinder body 12a which is formed in the inner side portion 11a so as to be formed into a one end-closed hole shape and a piston 12b which slides in the cylinder body 12a. The piston 12b is formed into a one end-closed cylindrical shape.

A seal member 21 is provided between an inner circumference surface of the cylinder body 12a and an outer circumference surface of the piston 12b so as to restrain leakage of brake fluid. According to this embodiment, the seal member 21 is disposed on the inner circumference surface of the cylinder body 12a. Further, a boot 22 is provided between the inner circumference surface of the cylinder body 12a and the outer circumference surface of the piston 12b. The boot 22 is provided closer to a tip side of the piston 12b than the seal member 21. The boot 22 restrains dust and dirt from entering between the inner circumference surface of the cylinder body 12a and the outer circumference surface of the piston 12b. The boot 22 is formed of an elastic material (for example, rubber material) which stretches and contracts according to advance and retreat of the piston 12b. An inner circumference end portion of the boot 22 is engaged with an engagement portion of the outer circumference surface of the piston 12b and an outer circumference end portion of the boot 22 is engaged with an engagement portion of the inner circumference surface of the cylinder body 12a.

Brake fluid pressure is introduced into the cylinder body 12a of the wheel cylinder portion 12 through a communication passage, which is not shown in the drawings, so that wheel cylinder pressure is generated in a space as a brake fluid accommodation chamber defined with the cylinder body 12a and the piston 12b.

The driving shaft member 13a (corresponding to a rotation member) and the propulsion shaft member 13b are disposed in the cylinder body 12a. The driving shaft member 13a and the propulsion shaft member 13b are structured to push out the piston 12b and to press-fit an inner brake pad 15a to the brake disc 17, by driving the electric motor 14a.

One end of the driving shaft member 13a is connected to a gear, which is not shown in the drawings, in the gear box 14b through an insertion hole 12a1 formed in the cylinder body 12a. Further, one end portion of the driving shaft member 13a is rotatably supported by insertion into the insertion hole 12a1. An O-ring 23 as a seal member is provided between an outer circumference surface of the one end portion of the driving shaft member 13a and an inner circumference surface of the insertion hole 12a1.

The other end portion of the driving shaft member 13a is extended inside the piston 12b. A male screw portion 13a1 is formed on an outer circumference surface of the other end portion of the driving shaft member 13a.

The propulsion shaft member 13b is formed into a hollow cylindrical shape. A female screw portion 13b1 into which the male screw portion 13a1 of the driving shaft member 13a is screwed is formed on an inner circumference surface of the propulsion shaft member 13b. Keys 13b2 to be engaged with key ways 12b1 each of which is formed along an axial direction on an inner circumference surface of the piston 12b are provided to project on an outer circumference surface of the propulsion shaft member 13b. Therefore, the propulsion shaft member 13b is restricted from relatively rotating about the axis with respect to the piston 12b and is permitted to slide along the axis direction.

Hence, when the electric motor 14a is started to be driven so as to rotate the driving shaft member 13a about the axis, rotation force of the driving shaft member 13a is converted into force which moves the propulsion shaft member 13b along the axis direction, through engagement of the male screw portion 13a1 with the female screw portion 13b1. Further, when the electric motor 14a is stopped driving, the propulsion shaft member 13b is stopped at a stop position by friction force generated by the engagement of the male screw portion 13a1 with the female screw portion 13b1. When the braking force reaches to target braking force, the electric motor 14a is stopped driving, so that the propulsion shaft member 13b is held at the stop position.

Further, the electric motor 14a and the gear box 14b are disposed on the inner side portion 11a. The electric motor 14a is connected to the driving shaft member 13 a through the gear box 14b. The gear box 14b changes (reduces) rotational speedforce of the electric motor 14a into a predetermined reduction ratio and outputs the resultant rotational force to the driving shaft member 13a.

A parking brake actuator A includes the driving shaft member 13a, the propulsion shaft member 13b, the electric motor 14a, and the gear box 14b which are described above. The parking brake actuator A converts a rotational movement of the rotation member into a linear movement to transmit the linear movement to the piston. The parking brake actuator A presses the brake disc rotated with the wheel by the inner brake pad that is disposed in the inner side portion of the inner and outer both side portions of the caliper and that is forced by the piston and an outer brake pad disposed in an outer side portion of the caliper so as to be located at an opposite side to the inner brake pad. The braking force is thus generated on the wheel.

The pair of brake pads 15a, 15b are structured to press-fit both sides of the brake disc 17 which is integrally rotated with the wheel which is not shown in the drawings. The brake pad 15a is the inner brake pad, and the brake pad 15b is the outer brake pad. The inner brake pad 15a is disposed between the piston 12b and the brake disc 17. The inner brake pad 15a is held in the inner side portion 11a of the caliper 11 so as to be slidable along a rotational axis direction of the brake disc 17 and so as to be unrotatable about a rotational axis.

The outer brake pad 15b is disposed between an inner wall surface of the outer side portion 11b of the caliper 11 and the brake disc 17. The outer brake pad 15b is held by the outer side portion 11b of the caliper 11 so as to be slidable along the rotational axis direction of the brake disc 17 and so as to be unrotatable about the rotational axis.

As shown in FIG. 2, the inner brake pad 15a is formed into an elongated arc shape. The inner brake pad 15a is provided with an inner shim 16a disposed on a back face thereof. The back face of the inner brake pad 15a is located to be opposite to the brake disc 17. The inner shim 16a includes a first shim 16a1 which is made of metal and which is disposed on the inner side (piston 12b side) and a second shim 16a2 which is also made of metal and which is disposed on the outer side (brake disc 17 side). The first shim 16a1 comes into contact with a pressing surface of the piston 12b. The second shim 16a2 is disposed between the inner brake pad 15a and the first shim 16a1 to decrease friction resistance of the back face (opposite side surface to the brake disc 17) of the inner brake pad 15a. Friction resistance between the first shim 16a1 and the second shim 16a2 is set to be relatively small. The second shim 16a2 may be integrally formed on the back face of the inner brake pad 15a.

A projection 15a1 is formed on the inner brake pad 15a so as to project from a portion of the back face of the inner brake pad 15a. The projection 15a1 is composed of a pair of left and right projections 15a1a, 15a1b. The pair of left and right projections 15a1a, 15a1b are disposed at left and right end portions of the inner brake pad 15a, respectively. Each of the pair of left and right projections 15a1a, 15a1b is formed into a circular shape in section. Each of the pair of left and right projections 15a1a, 15a1b may be formed into, for example, a rectangular shape or an oval shape in section.

The first shim 16a1 (31) is provided with a shim body 31a, an inner engaging part 31b, and a plurality of inner hooks 31c as shown in FIGS. 3a, 3b. The shim body 31a is formed into an elongated arc shape with a metal thin plate. The inner engaging part 31b is engaged with the projection 15a1 projecting from a portion of the back face of the inner brake pad 15a so that relative rotation about a central axis of the piston 12b is restricted. The inner engaging part 31b is composed of a pair of left and right notch portions 31b1, 31b2. The pair of left and right notch portions 31b1, 31b2 are disposed at left and right end portions of the shim body 31a, respectively. Each of the pair of left and right notch portions 31b1, 31b2 is an elongated notch portion along a longitudinal direction (substantially the same direction as a circumferential direction of the brake disc 17). The inner shim 16a is a shim which directly comes into contact with a pressing surface of the piston 12b. According to this embodiment, the first shim 16a1 corresponds to the inner shim.

A clearance between the projection 15a1 and the inner engaging part 31b in a transverse direction (substantially the same direction as a radial direction of the brake disc 17) is substantially 0. When the piston 12b is rotated while a parking brake is performed, rotation torque of the piston 12b is applied to the inner shim 16a. However, since the projection 15a1 and the inner engaging part 31b are engaged with each other, relative rotation of the inner shim 16a (first shim 16a1) is restricted.

A clearance between the projection 15a1 and the inner engaging part 31b in the longitudinal direction (substantially the same direction as the circumferential direction of the brake disc 17) has a predetermined quantity. Hence, relative movement between the inner shim 16a (first shim 16a1) and the inner brake pad 15a in the circumferential direction is permitted by the predetermined quantity while the service brake or the parking brake of the brake mechanism 10 is performed.

Each of the inner hooks 31c is slidably engaged with an outer periphery edge of the inner brake pad 15a. The inner hooks 31c fix the inner shim 16a to the inner brake pad 15a. The inner hooks 31c are respectively disposed on upper and lower portions of each of left and right end portions of the shim body 31a. Each of the inner hooks 31c is provided with a bend portion 31c1 bent from the shim body 31a and a retain portion 31c2 retaining the outer periphery edge of the inner brake pad 15a. The inner hooks 31c positioned at the upper and lower portions respectively force the inner brake pad 15a in upper and lower directions and sandwich the inner brake pad 15a, so that the inner shim 16a is fixed to the inner brake pad 15a.

As shown in FIG. 4, the outer brake pad 15b is formed into an elongated arc shape. The outer brake pad 15b is provided with an outer shim 16b disposed on a back face thereof. The back face of the outer brake pad 15b is located to be opposite to the brake disc 17. The outer shim 16b is composed of a first shim 16b1 which is made of metal and which is disposed on the outer side (side of outer side portion 11b of the caliper 11) and a second shim 16b2 which is also made of metal and which is disposed on the inner side (brake disc 17 side). The first shim 16b1 comes into contact with a pressing surface (inner wall surface) of the outer side portion 11b of the caliper 11. The second shim 16b2 is disposed between the outer brake pad 15b and the first shim 16b1 to decrease friction resistance of the back face (opposite side surface to the brake disc 17) of the outer brake pad 15b. Friction resistance between the first shim 16b1 and the second shim 16b2 is set to be relatively small. The second shim 16b2 may be integrally formed on the back face of the outer brake pad 15b.

A projection 15b1 is formed on the outer brake pad 15b so as to project from a portion of the back face of the outer brake pad 15b. The projection 15b1 is composed of a pair of left and right projections 15b1a, 15b1b. The pair of left and right projections 15b1a, 15b1b are disposed at left and right end portions of the outer brake pad 15b, respectively. Each of the pair of left and right projections 15b1a, 15b1b is formed into a circular shape in section. Each of the pair of left and right projections 15b1a, 15b1b may be formed into, for example, a rectangular shape or an oval shape in section.

The first shim 16b1 (32) is provided with a shim body 32a, an outer engaging part 32b, and a plurality of outer hooks 32c as shown in FIGS. 5a, 5b. The shim body 32a is formed into an elongated arc shape with a metal thin plate. The outer engaging part 32b is composed of a pair of left and right notch portions 32b1, 32b2. The pair of left and right notch portions 32b1, 32b2 are disposed at left and right end portions of the shim body 32a, respectively. Each of the pair of left and right notch portions 32b1, 32b2 is an elongated notch portion along the longitudinal direction (substantially the same direction as the circumferential direction of the brake disc 17). The outer shim 16b is a shim which directly comes into contact with the pressing surface (inner wall surface) of the outer side portion 11b of the caliper 11. According to this embodiment, the first shim 16b1 corresponds to the outer shim.

A clearance between the projection 15b1 and the outer engaging part 32b in the transverse direction (substantially the same direction as the radial direction of the brake disc 17) has a predetermined quantity. As described above, the clearance between the projection 15b1 of the outer brake pad 15b and the outer engaging part 32b in the radial direction is set to be larger than the clearance between the projection 15a1 of the inner brake pad 15a and the inner engaging part 31b of the inner shim 16a in the radial direction. Hence, relative movement between the outer shim 16b (first shim 16b1) and the outer brake pad 15b in the radial direction is permitted by the predetermined quantity while the service brake or the parking brake of the brake mechanism 10 is performed.

A clearance between the projection 15b1 and the outer engaging part 32b in the longitudinal direction (substantially the same direction as the circumferential direction of the brake disc 17) has a predetermined quantity. Hence, relative movement between the outer shim 16b (first shim 16b1) and the outer brake pad 15b in the circumferential direction is permitted by the predetermined quantity while the service brake or the parking brake of the brake mechanism 10 is performed.

Each of the outer hooks 32c is slidably engaged with an outer periphery edge of the outer brake pad 15b. The outer hooks 32c fix the outer shim 16b to the outer brake pad 15b. At least one outer hook 32c is disposed on an outer periphery end of a radially outer direction side of the outer brake pad 15b, and at least one outer hook 32c is disposed on an outer periphery end of the radially inner direction side of the outer brake pad 15b. According to this embodiment, the outer hooks 32c are respectively disposed on upper and lower portions of each of left and right end portions of the shim body 32a. Each of the outer hooks 32c is provided with a bend portion 32c1 bent from the shim body 32a and a retain portion 32c2 retaining the outer periphery edge of the outer brake pad 15b. The outer hooks 32c positioned at the upper and lower portions respectively force the outer brake pad 15b in the upper and lower directions and sandwich the outer brake pad 15b, so that the outer shim 16b is fixed to the outer brake pad 15b.

Each outer hook 32c is structured to have a set spring constant (desired spring constant to be set) at which the outer shim 16b is movable in the radially outer direction side with respect to the outer brake pad 15b while the parking brake which generates the braking force is performed. Preferably, the set spring constant of each of the outer hooks 32c is set based on at least one of a width of each outer hook 32c, a thickness of each outer hook 32c, a length of each outer hook 32c, and a bending radius of the bend portion 32c1 of each outer hook 32c. That is, when at least one of the width of each outer hook 32c, the thickness of each outer hook 32c, the length of each outer hook 32c, and the bending radius of the bend portion 32c1 of each outer hook 32c is set a predetermined value, a spring constant of each outer hook 32c is set to be the set spring constant.

As is apparent from the above description, the electric parking brake device 1 of this embodiment is configured to drive the parking brake actuator A. The parking brake actuator A converts the rotational movement of the driving shaft member 13a (rotation member) into the linear movement to transmit the linear movement to the piston 12b. The parking brake actuator A presses the brake disc 17 rotated with the wheel by the inner brake pad 15a that is disposed in the inner side portion 11a of the inner and outer both side portions 11a, 11b of the caliper 11 and that is forced by the piston 12b and the outer brake pad 15b disposed in the outer side portion 11b of the caliper 11 so as to be located at the opposite side to the inner brake pad 15a. The braking force is thus generated on the wheel. The inner brake pad 15a includes the inner shim 16a disposed on the back face of the inner brake pad 15a that is provided on the opposite side to the brake disc 17. The outer brake pad 15b includes the outer shim 16b disposed on the back face of the outer brake pad 15b that is provided on the opposite side to the brake disc 17. The inner shim 16a is provided with the inner engaging part 31b that is engaged with the projection 15a1 projecting from a portion of the back face of the inner brake pad 15a so that the relative rotation about the central axis of the piston 12b is restricted. The outer shim 16b is provided with the outer hooks 32c that are slidably engaged with the outer periphery edge of the outer brake pad 15b. At least one of the outer hooks 32c is provided on the outer periphery end in the radially outer direction side of the outer brake pad 15b, and at least one of the outer hooks 32c is provided on the outer periphery end in a radially inner direction side of the outer brake pad 15b. The set spring constant of each outer hook 32c is set to allow the outer shim 16b to move in the radially outer direction side with respect to the outer brake pad 15b while the parking brake that generates the braking force is performed.

According to the above structure, the inner shim 16a is provided with the inner engaging part 31b that is engaged with the projection 15a1 projecting from a portion of the back face of the inner brake pad 15a so that the relative rotation about the central axis of the piston 12b is restricted. Therefore, although torque (braking torque) is generated on the piston 12b while the parking brake is performed, the relative rotation of the inner shim 16a to the inner brake pad 15a is restricted. Consequently, the piston 12b is also restricted from relatively rotating to the inner brake pad 15a. Hence, damage of the seal member 21 (piston seal) or the boot 22 (piston boot) which is sometimes damaged by the rotation of the piston 12b is suppressed.

Further, the set spring constant of each outer hook 32c of the outer shim 16b is set to allow the outer shim 16b to move in the radially outer direction side with respect to the outer brake pad 15b while the parking brake that generates the braking force is performed. Therefore, although force which operates in the radially outer direction side is applied to the outer brake pad 15*b* from the outer side portion 11*b* of the caliper 11 due to an application of the parking brake, the force in the radial direction is buffered by the outer shim 16*b* to suppress damage of the electric parking brake device 1.

As described above, the electric parking brake device 1 whose damage is suppressed while the parking brake is performed is provided.

Further, the set spring constant of each outer hook 32*c* is set based on at least one of the width, the thickness, the length, and bending radius of each outer hook 32*c*.

Therefore, the outer shim 16*b* is simply structured so that the set spring constant is set to allow the outer shim 16*b* to move in the radially outer direction side with respect to the outer brake pad 15*b* while the parking brake is performed.

Furthermore, according to the electric parking brake device 1 described above, it is not necessary for the inner shim 16*a* to be permitted to move in the radial direction and it is necessary for the outer shim 16*b* to be permitted to move in the radial direction.

The outer engaging part 32*b* engaged with the projection 15*b*1 which projects from a portion of the back face of the outer brake pad 15*b* is formed on the outer shim 16*b*. Therefore, the clearance between the projection 15*b*1 of the outer brake pad 15*b* and the outer engaging part 32*b* in the radial direction is preferably set to be larger than the clearance between the projection 15*a*1 of the inner brake pad 15*a* and the inner engaging part 31*b* of the inner shim 16*a* in the radial direction.

Hence, according to the above structure, the outer shim 16*b* buffers the force applied in the radially outer direction side more effectively than the inner shim 16*a*.

The present invention may be applied to a fixed type caliper as well as a floating type caliper. Further, the present invention may be applied to a caliper including a plurality of pistons on one side as well as a caliper including only one piston on one side.

The invention claimed is:

1. An electric parking brake device for driving a parking brake actuator configured to convert a rotational movement of a rotation member into a linear movement to transmit the linear movement to a piston, and configured to press a brake disc rotated with a wheel by an inner brake pad that is disposed in an inner side portion of inner and outer both side portions of a caliper and that is forced by the piston and an outer brake pad disposed in an outer side portion of the caliper so as to be located at an opposite side to the inner brake pad, to generate braking force on the wheel, wherein:
the inner brake pad includes an inner shim disposed on a back face of the inner brake pad that is provided on an opposite side to the brake disc;
the outer brake pad includes an outer shim disposed on a back face of the outer brake pad that is provided on an opposite side to the brake disc;
the inner shim is provided with an inner engaging part that is engaged with a projection projecting from a portion of the back face of the inner brake pad so that relative rotation about a central axis of the piston is restricted;
the outer shim is provided with outer hooks that are slidably engaged with an outer periphery edge of the outer brake pad;
at least one of the outer hooks is provided on an outer periphery end in a radially outer direction side of the outer brake pad and at least one of the outer hooks is provided on an outer periphery end in a radially inner direction side of the outer brake pad;
each outer hook has a set spring constant that is set to allow the outer shim to move in the radially outer direction side with respect to the outer brake pad while a parking brake that generates the braking force is performed;
an outer engaging part engaged with a projection that projects from a portion of the back face of the outer brake pad is formed on the outer shim; and
a clearance between the projection of the outer brake pad and the outer engaging part of the outer shim in a radial direction is larger than a clearance between the projection of the inner brake pad and the inner engaging part of the inner shim in the radial direction.

2. The electric parking brake device according to claim 1, wherein:
the set spring constant of each outer hook is set based on at least one of a width, a thickness, a length, and a bending radius of each outer hook.

* * * * *